Nov. 26, 1935.  W. M. WHITE ET AL  2,022,395
BUTTERFLY VALVE
Filed Sept. 14, 1933
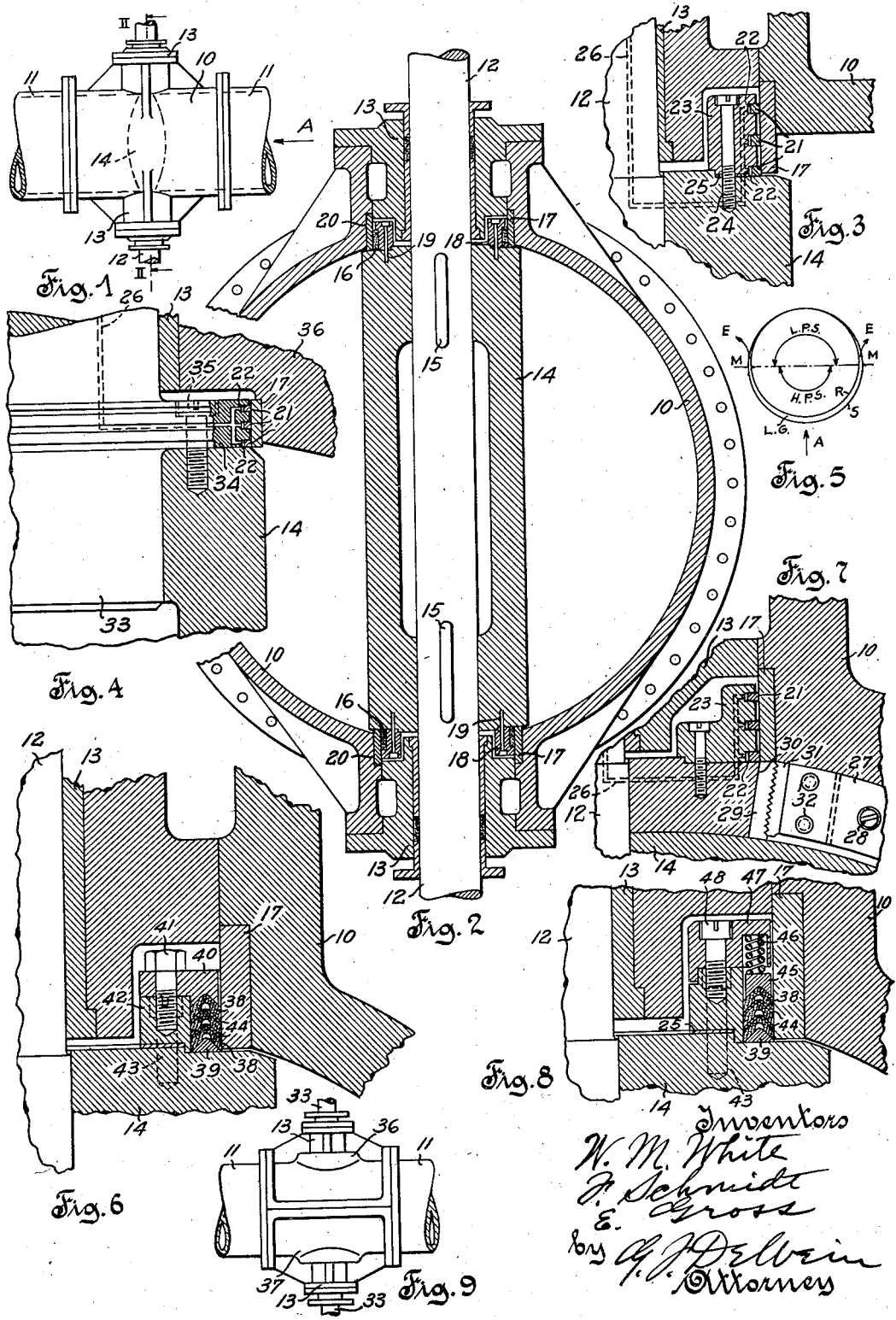

Patented Nov. 26, 1935

2,022,395

UNITED STATES PATENT OFFICE 2,022,395

BUTTERFLY VALVE

William M. White, Milwaukee, and Franz Schmidt and Emil Gross, Wauwatosa, Wis.; said Schmidt and said Gross assignors to Allis-Chalmers Manufacturing Company, Milwaukee, Wis., a corporation of Delaware Application September 14, 1933, Serial No. 689,390

14 Claims. (Cl. 251—11)

This invention relates generally to valves of the butterfly type and particularly to means for packing the rotatable wicket of a butterfly valve.

Heretofore considerable difficulty has been experienced with butterfly valves in that it is practically impossible to prevent more or less leakage of fluid past the valve wicket when it is in closed position. Leakage occurs particularly at points adjacent to the valve shaft where the peripheral packing segments of the wicket terminate. This leakage adjacent to the shaft is more pronounced in valves of large size for the reason that the clearance space between the valve shaft and its bearing is necessarily greater in a large valve than the clearance space in the bearing of a small valve. Also because of displacement and distortion of the valve wicket and the valve casing under pressure, it is difficult to effect water-tight connection in a large valve between the ends of the peripheral packing segments and the valve shaft. A considerable amount of leakage occurs in large valves by reason of the fact that fluid passes longitudinally into the shaft bearing clearance spaces on the high pressure side of the wicket, then passes circumferentially around the shaft and escapes longitudinally at the low pressure side of the wicket.

The general object of the present invention is to provide a butterfly valve which is so packed that it may be closed to entirely prevent the flow of fluid through the conduit of which the valve is a part.

A more specific object of the invention is to provide packing means for a butterfly valve disposed to prevent leakage of fluid past the valve wicket at the points at which the shaft joins the wicket.

A further object of the invention is to provide a butterfly valve having packing means disposed to prevent fluid from entering the bearings supporting the wicket shaft.

A still further object of the invention is to provide a butterfly valve in which the shaft bearings are so protected from the fluid within the casing that the bearings may be dismantled for repair without the necessity of draining the fluid from the valve casing.

According to the present invention, a butterfly valve having peripheral wicket packing segments terminating adjacent to the wicket shaft is provided with packing rings arranged concentric with the shaft at each end of the wicket and having water-tight connection with the wicket and with the ends of the peripheral packing segments, forming a continuous packing element around the wicket. The packing rings are engaged by and arranged to turn within encircling seating elements disposed on the valve casing concentric with the shaft bearings, and the rings cooperate therewith to effectively prevent leakage of fluid into the bearings or past the wicket at its point of connection with the shaft.

The foregoing and other objects of the invention may be achieved by valve mechanism having packing elements of the types described by way of example in the following part of this specification in conjunction with the illustrations of the accompanying drawing, in which:

Fig. 1 is a plan view, on a reduced scale, of a butterfly valve with parts of a conduit connected thereto;

Fig. 2 is a view in transverse section through the butterfly valve taken generally on the plane indicated by the line II—II in Fig. 1 with the wicket in open position and showing the packing elements embodying the invention, part of the casing being broken away;

Fig. 3 is an enlarged fragmentary view in longitudinal section showing a modified packing element, the wicket being shown in closed position;

Fig. 4 is a fragmentary view similar to Fig. 3 showing another modification of the invention;

Fig. 5 is a diagram illustrating how leakage fluid may pass around the valve shaft from the high pressure to the low pressure side of the wicket;

Fig. 6 is a fragmentary view in transverse section illustrating another modification of the invention, the wicket being in open position;

Fig. 7 is a fragmentary view in transverse section of a further modification of the invention showing the wicket in closed position and illustrating the manner in which the peripheral packing segments cooperate with the packing rings to entirely prevent the leakage of fluid;

Fig. 8 is a fragmentary view in transverse section illustrating a still further modification of the invention with the wicket in open position; and Fig. 9 is a plan view, on a reduced scale, of a butterfly valve having a two-part casing.

The valve illustrated generally in Fig. 1 comprises a valve casing 10 that is connected between sections of and constitutes a continuation of a flow conduit 11. The valve is provided with a transversely arranged operating shaft 12 supported in opposite sides of the casing by trunnion journal bearings 13. A valve disk or wicket 14 for closing the passage through the valve is carried within the casing 10 upon the shaft 12 and secured thereto for rotation therewith by keys 15, shown in Fig. 2.

When the butterfly valve is closed, with the wicket 14 disposed transversely of the casing as indicated in dotted lines in Fig. 1, the wicket and the shaft 12 are forced in the direction of the pressure exerted by the fluid in the conduit 11, which is indicated by the arrow A. This causes the shaft 12 to bear against the downstream side of the bearings 13 in such manner that the clearance space between the shaft and the bearings assumes the shape illustrated diagrammatically in Fig. 5.

In this figure, the outer circle S represents the stationary surface of the bearing 13 and the inner circle R represents the cooperating rotating surface of the shaft 12. The line M—M represents the transverse plane in which the valve wicket and its peripheral packing segments lie when the valve is closed, and the high pressure and low pressure sides of the valve wicket are indicated by the arcs H. P. S. and L. P. S. respectively, the pressure being in the direction of the arrow A. By reason of the displacement of the shaft 12 in the downstream direction, the clearance space between the shaft and the bearing assumes a shape which forms a leakage gap, shown greatly exaggerated in Fig. 5 and indicated by the character L. G., at the upstream side of the shaft.

In butterfly valves of usual construction, fluid enters the leakage gap L. G. longitudinally at the high pressure side and then passes circumferentially around the surface R of the shaft past the wicket line M—M to the low pressure side thereof. The fluid then escapes longitudinally from the leakage gap at the low pressure side of the line M—M as indicated by the arrows E.

In accordance with the present invention, leakage circumferentially of the shaft within the bearings is entirely prevented by a packing element arranged to prevent the fluid in the valve casing from entering the leakage gap between the bearing and the shaft.

As shown in Fig. 2, the packing means embodying the invention comprises, essentially, a cylindrical packing ring 16, which is arranged at each end of the wicket 14 concentric with the shaft 12 and in water-tight connection with the end surface of the wicket. The packing rings 16 each cooperate with an annular seating element 17 carried by the casing 10 in concentric relation with each of the bearings 13. In this embodiment of the invention the packing rings 16 may be of any resilient packing material of circular form. Each ring 16 is carried by a supporting ring 18 attached to the ends of the wicket 14 by screw bolts 19. The cooperating seating element 17 comprises a right cylinder ring having an internal cylindrical seating surface for engaging the peripheral surface of the packing ring 16 and the ring 17 is mounted in a complementary annular recess 20 in the casing 10 in such manner as to have water-tight connection therewith and to present at its inner edge a radial annular bearing face merging into the seating surface of the casing. When the valve is operated to change the position of the wicket, the packing ring 16 turns with the shaft 12 and the wicket 14, and consequently rotates within the cooperating ring 17 while maintaining engagement with the ring from its innermost edge longitudinally outward and throughout its entire circumference to effectively prevent fluid from passing into the shaft bearings. When the valve wicket is in the closed position, the packing rings 16 cooperate with the peripheral packing of the wicket to entirely prevent leakage of fluid from the high pressure to the low pressure side of the valve.

In the modification of the invention shown in Fig. 3, the ring of packing material 16 is replaced by a plurality of metallic expansion rings or piston rings 21 that are carried in concentric relation with the shaft 12 in grooves 22 formed in a supporting ring 23 attached to the end of the wicket 14 by screw bolts 24. Suitable packing 25 is disposed between the supporting ring 23 and the end of the wicket, and one of the piston rings 21 is arranged in contact with the wicket end face to prevent leakage of fluid between the supporting ring and the wicket. To lubricate the piston rings 21 and to fill the spaces adjacent thereto for preventing the accumulation of silt or other foreign matter therein, a suitable lubricant such as grease may be forced into the ring grooves 22 through a lubricating passageway 26 that extends longitudinally of the shaft 12 and communicates with each groove 22.

By a comparison between Figs. 2 and 3, which are sections taken at right angles to each other, it may be seen that because of the fact that the inner surface of the casing 10 is cylindrical, the edges of the wicket 14 must be relieved or cut away, particularly at the widened end portions thereof, in order that they may clear the inner surface of the casing when the wicket is in the open position shown in Fig. 2. Consequently, a considerable amount of space exists between the edges of the wicket end portions and the inner surface of the casing when the wicket is in the closed position shown in Fig. 3. Because of this variation in the distance between the edges of the wicket end portions and the inner surface of the casing, it is not feasible to provide packing means on the wicket arranged to directly engage the curved wall of the casing. This difficulty is overcome in accordance with the present invention by means of the cylindrical seating ring 17 which is mounted within the casing to provide a continuous internal right section cylindrical surface for engaging the periphery of the packing ring 21 continuously in all positions around the circumference thereof.

Fig. 7 shows a modification of the invention similar to that shown in Fig. 3, the supporting ring 23 being of somewhat different shape. This figure is a transverse sectional view, at right angles to the longitudinal section of Fig. 3, and likewise shows the valve wicket in closed position. As shown in this view, the wicket 14 is provided on its periphery with a segmental or arcuate packing element 27 that is adapted to engage a seating surface on the inside of the valve casing 10 when the valve is closed and to engage at its ends the end faces of the rings 17 which merge with the casing seating surface. The peripheral packing element 27 is made of material that may be deflected readily and is attached to the periphery of the wicket by adjusting screws 28 by means of which it may be adjusted to accurately engage the internal seating surface of the casing.

By reason of the fact that the packing element 27 is moved relative to the wicket when it is adjusted to fit the casing, the end of the segment does not remain in fixed relation to the end portion of the wicket. To prevent leakage of fluid between the end of the packing segment 27 and the wicket, a deformable packing element 29 of expansible resilient material, such as precompressed rubber, is interposed between the ends of the peripheral packing 27 and a radially disposed shoulder 30 which is arranged at the end of the wicket substantially in alinement with the outer sealing surface of the piston rings 21. The rubber packing 29 is carried by a metal base 31 of substantially T-shape to which it is preferably attached by vulcanizing. The base 31 is fitted within a groove in the end of the peripheral packing 27 and secured thereto by rivets or bolts 32. When the peripheral packing 27 is moved relative to the wicket, the expansible packing 29 changes its shape to adapt itself to, and completely fill the space between the end of the packing 27 and the shoulder 30 of the wicket.

As shown in the drawing, the face of the packing 29 which constitutes an extension of the sealing face of the packing segment 27 lies in a plane at right angles to the axis of the shaft 12 and bears against the end face of the sealing ring 17 from its innermost edge outwardly in such manner that water-tight connection is effected between the ring 17 and the peripheral packing of the wicket when the valve is closed. When the wicket is rotated the face of the packing 29 turns in frictional engagement with the edge of the ring 17.

In the embodiment of the invention shown in Fig. 4, the valve is provided with two stub shafts 33 arranged in alinement at the ends of the wicket, replacing the through shaft 12 shown in Fig. 2. By utilizing the stub shafts 33, each shaft stub may be formed with an integral flange 34 that is provided in its periphery with grooves 22 for receiving the piston rings 21. The flange 34 also serves as means for attaching the shaft 33 to the end of the wicket 14 to which it is secured by longitudinally disposed screw bolts 35. By reason of the fact that the shafts 33 must be attached to the wicket before it is placed within the casing 10, it is desirable to utilize a casing divided longitudinally into two half casings 36 and 37 respectively as shown in Fig. 9. In assembling a valve of this type the half casings are fitted over the ends of the shaft 33 and are then secured together to enclose the wicket 14.

In the modification of the invention shown in Fig. 6, the packing element which cooperates with the seating ring 17 comprises a plurality of packing rings 38 of V-sections which are known as "chevron packings". The stacked rings of chevron packings bear upon an annular supporting member 39 of complementary V-shape which is carried on the end face of the wicket 14 and the rings are pressed into engagement therewith by an annular following member 40 having a complementary V-groove for engaging the packing. The following member 40 is clamped upon the rings of packing by screw bolts 41 which clamp it to a supporting ring 42 that is in turn secured to the end of the wicket by screw bolts 43. The chevron packing rings 38 may be separated by metallic V-section annular elements 44 which also function to prevent the flow of liquid along the inner surface of the ring 17.

The modification of the invention illustrated in Fig. 8 is similar to that shown in Fig. 6 with the addition of resilient means for compressing the packing rings 38 and 44. As shown, in this modification, the packing rings are engaged by a floating following ring 45 of annular shape which is pressed against the packing by a plurality of circumferentially distributed coil springs 46 carried in recesses in a ring 47 that is secured to the supporting ring 42 by screw bolts 48.

Although several particular embodiments of the invention have been described in detail in order to illustrate and to adequately disclose the invention, various other modifications of the structures herein shown and described may be made without departing from the spirit and scope of the invention as defined in the subjoined claims.

We claim:

1. A butterfly valve comprising a casing, a valve disk disposed within said casing for closing it, a shaft journaled in said casing and arranged in the plane of said disk to support it, arcuate packing elements arranged on the periphery of said disk to engage said casing and disposed with their ends adjacent to said shaft, cylindrical packing elements arranged concentric with said shaft in water-tight connection with said valve disk and engaging the ends of said arcuate packing elements, and internal cylindrical seating elements carried by said casing in cooperating relation with said cylindrical packing elements and having water-tight connection with said casing to prevent leakage along and around said shaft when said valve disk is in closed position.

2. A butterfly valve comprising a casing having a valve seat and journal bearings arranged in a transverse plane each journal bearing having a circular seating element arranged concentric therewith, a shaft journaled in said bearings, a valve disk carried by said shaft, a circular packing element having continuous connection with said valve disk and disposed concentric with said shaft at each side of the disk in position to cooperate with one of said circular seating elements on the casing, and arcuate packing elements arranged on the periphery of said valve disk to engage the valve seat in said casing and having rotatable sealing connection at their ends with the ends of said circular seating elements.

3. A butterfly valve comprising a casing provided with alined openings for receiving a shaft transversely thereof each opening having a concentric internal cylindrical seating surface and said casing having an internal valve seating surface arranged in the transverse plane of said shaft openings and intersecting each of said internal cylindrical seating surfaces in the plane of its inner edge, a shaft journaled in said openings, a valve disk carried by said shaft, cylindrical packing rings continuously connected to said disk and arranged concentric with said shaft in position to cooperate with and turn within each of said cylindrical seating surfaces, and arcuate packing elements arranged on the periphery of said disk with their ends in engagement with the ends of said cylindrical seating surfaces to form therewith a continuous water-tight seal when said disk is in closed position.

4. The combination with a butterfly valve including a casing, a shaft journaled in said casing, and a valve disk mounted upon said shaft to rotate therewith, of sealing means for the journals of said shaft comprising a ring having an internal seating surface defining a right cylinder and mounted on the inside of said casing concentric with said shaft bearing, and a flexible packing ring of shape complementary to said internal right cylinder seating surface carried by said valve disk in cooperative relation with said seating surface.

5. In a butterfly valve, the combination with a casing and a valve disk having a shaft rotatably mounted in said casing, of sealing means for said shaft in said casing comprising cylindrical packing rings mounted concentric with said shaft and having tight connection with said disk, and right cylinder rings having internal cylindrical seating surfaces complementary to said packing rings and mounted concentric thereto for cooperating therewith upon and in water-tight connection with said housing.

6. A butterfly valve comprising a casing, a shaft journaled transversely of said casing, a valve disk carried by said shaft within said casing, packing material on the periphery of said disk adapted to engage the inner surface of said casing when the disk is in closed position, a cylindrical packing ring arranged concentric with said shaft at each edge of said disk and having tight connection with said disk and engaging said packing material on the periphery of said disk, and a seating ring having a cylindrical internal surface complementary to said packing ring surface arranged concentric with each packing ring for rotatable engagement therewith and having tight connection with said housing.

7. A butterfly valve comprising a casing having trunnion bearings, a shaft carrying a valve disk journaled in said bearings, a packing ring having a cylindrical surface disposed in concentric relation with said shaft and having liquid tight connection with said disk, and an internal right section cylindrical seating ring carried by said casing and disposed to engage the periphery of said packing ring to prevent leakage of liquid circumferentially of said shaft.

8. A butterfly valve comprising a casing having opposed journal bearings provided with concentric internal seating surfaces at their inner ends, a valve disk within said casing, a shaft protruding from said disk at opposite edges thereof and journaled in said bearings, a circular packing ring carried by said disk in concentric relation with each protruding portion of said shaft and disposed to engage and turn within the respective internal seating surface of said casing, and means continuously connecting said packing rings with said valve disk whereby leakage past said disk when the valve is closed is prevented.

9. A butterfly valve, comprising a circular casing having diametrically disposed trunnion bearings and a cylindrical internal sealing surface disposed concentric with each of said trunnion bearings and terminating at its inner edge in a radial surface disposed in a transverse plane of said bearing within and merging at diametrically opposite edges with the circle of said casing, a valve disk disposed within said valve casing for cooperating therewith and rotatably supported in said trunnion bearings, circular packing elements carried by said valve disk, said circular packing elements respectively being complementary to and in position to engage and cooperate with each of said cylindrical internal sealing surfaces of said casing at and near the inner edge thereof, and packing segments carried on the periphery of said valve disk in position to seal said disk in said casing and to engage with their ends said circular packing elements and said radial plane surfaces at the inner edges of said cylindrical sealing surfaces, whereby water-tight packing of said valve disk when in closed position is effected.

10. Sealing means for the trunnions of a butterfly valve of the type including the usual valve casing and cooperating rotatable valve disk, comprising a pair of seating rings mounted on the valve casing in fluid-tight relation therewith at each side thereof concentric with the axis of rotation of the valve disk and each presenting at its inner end an annular right section bearing face in a plane of rotation of the valve disk and merging with the inner surface of the casing in a transverse plane thereof through the axis of rotation of the valve disk said seating rings each also presenting internal right section cylindrical sealing surfaces concentric with the axis of rotation of the valve disk, resilient packing segments disposed on the periphery of said valve disk to effect fluid-tight engagement with the inner surface of said casing when the disk is in closed position said segments extending at their ends to the innermost edges of the annular bearing faces of said seating rings and having fluid-tight rotatable engagement with said bearing faces, and resilient cylindrical packing elements mounted in fluid-tight connection on said valve disk in positon to effect rotatable sealing engagement with the internal cylindrical sealing surface of each of said seating rings at the innermost edge thereof and in the region adjacent to said edge, whereby complete fluid-tight sealing of said valve disk when in closed position is effected.

11. A butterfly valve comprising a casing constituting a cylindrical fluid conduit provided at diametrically opposite positions with trunnion bearings and having an inwardly extending seating portion concentric with each of said trunnion bearings said seating portions each presenting an internal right section cylindrical seating surface and presenting at the inner end thereof an annular bearing face disposed in a plane transverse to the axes of said trunnion bearings and merging at diametrically opposite edges into the internal cylindrical surface of said casing at points in a transverse plane of said casing through said trunnion bearings, a valve disk rotatably mounted in said trunnion bearings for closing said conduit, peripheral packing segments carried by said disk the end portions of said segments cooperating with said annular bearing faces of said seating portions from the innermost edges thereof outwardly in rotatable sealing engagement and the remaining portions of which engage the cylindrical inner surface of said casing between the points of merger thereof with said bearing faces when the disk is in closed position, and a resilient cylindrical packing carried by said disk concentric with its axis of rotation and at each end thereof each of said resilient packings being disposed in rotatable sealing engagement with the internal cylindrical seating surfaces of the corresponding inwardly extending seating portion from the innermost edge thereof longitudinally outward to effect complete sealing of said valve disk when in closed position.

12. Sealing means for a butterfly valve of the type including the usual valve casing and cooperating rotatable valve disk, comprising right section seating rings mounted in each side of said casing in fluid-tight connection therewith and concentric with the axis of rotation of the valve disk said seating rings each presenting at its inner end an annular bearing surface disposed in a plane of rotation of the valve disk and merging with the inner surface of the casing substantially in a transverse plane thereof through the axis of rotation of the valve disk and said seating rings each also presenting internal right section cylindrical sealing surfaces concentric with the axis of rotation of the valve disk, resilient packing segments disposed upon the periphery of said valve disk to effect fluid-tight engagement with the inner surface of said casing when the valve disk is in closed position the ends of said segments extending across the annular bearing surfaces of said seating rings to the innermost edges thereof in rotatable fluid-tight engagement therewith, and a metallic expansion piston ring carried at each end of said valve disk in fluid-tight relation therewith and concentric with the axis of rotation thereof in position to each effect rotatable sealing engagement with the internal right section cylindrical sealing surface of the adjacent cooperating seating ring at the innermost edge of said seating ring to effect complete sealing of said valve disk when in closed position.

13. In a butterfly valve, the combination with a valve casing constituting a passageway for fluid, a valve shaft journaled transversely of said casing, and a valve disk rotatably supported by said shaft in said casing in such manner as to be capable of closing said fluid passageway through said casing, of means to prevent leakage of fluid past said valve disk when in closed position, comprising a right cylinder ring mounted in each side of said casing in fluid-tight connection therewith and in position to encircle said valve shaft said rings each presenting inwardly of said casing an annular bearing surface disposed in a plane of rotation of said valve disk and presenting an internal cylindrical bearing surface concentric with the axis of rotation of said valve disk, a cylindrical packing ring carried by said valve disk in fluid-tight connection therewith in position to rotatably engage said internal cylindrical bearing surface of said right cylinder ring at its innermost edge and outwardly therefrom, and segmental peripheral packing strips carried on the periphery of said valve disk, said segmental strips having resilient fluid-tight connection at each end with said disk to permit circumferential movement of said segments and having resilient rotatable packing engagement with said annular bearing surface of said right cylinder ring at its innermost edge and outwardly therefrom.

14. In a butterfly valve, the combination with a valve casing constituting a passageway for fluid, a valve shaft disposed transversely of said valve casing, and a valve disk carried by said shaft in such manner as to be rotatable to a position closing said fluid passageway through said casing; of means for preventing leakage of fluid past said valve disk when in closed position, comprising a right cylinder sealing ring disposed at each side of said casing and encircling said shaft, each of said rings presenting at its inner end an annular bearing face in a plane of rotation of said valve disk and presenting a right section internal cylindrical seating surface, a cylindrical resilient packing ring carried by said valve disk in position to extend into and turn within said seating ring to effect sealing engagement therewith at the innermost edge portion of its internal seating surface, and segmental packing elements carried on the periphery of said valve disk for engaging the inner surface of said casing when the valve is in closed position, said segmental packing elements having resilient deformable end portions disposed to engage said valve disk to effect fluid tight connection therewith and disposed in rotatable fluid tight packing engagement with the bearing faces of said sealing rings.

WILLIAM M. WHITE.
FRANZ SCHMIDT.
EMIL GROSS.